(12) United States Patent
Sato (10) Patent No.: US 11,027,769 B2
(45) Date of Patent: Jun. 8, 2021

(54) STEERING SYSTEM (71) Applicant: JTEKT CORPORATION, Osaka (JP)

(72) Inventor: Yuto Sato, Nagoya (JP)

(73) Assignee: JTEKT CORPORATION, Osaka (JP)

(*) Notice: Subject to any disclaimer, the term of this patent is extended or adjusted under 35 U.S.C. 154(b) by 292 days.

(21) Appl. No.: 16/205,885

(22) Filed: Nov. 30, 2018

(65) Prior Publication Data
US 2019/0176872 A1    Jun. 13, 2019

(30) Foreign Application Priority Data
Dec. 8, 2017    (JP) .............................. JP2017-235906

(51) Int. Cl.
| | |
|---|---|
| *B62D 5/04* | (2006.01) |
| *B62D 5/00* | (2006.01) |
| *B62D 3/08* | (2006.01) |

(52) U.S. Cl.
CPC .............. *B62D 5/008* (2013.01); *B62D 3/08* (2013.01); *B62D 5/0403* (2013.01); *B62D 5/0421* (2013.01); *B62D 5/0424* (2013.01); *B62D 5/0481* (2013.01)

(58) Field of Classification Search
CPC ... B62D 5/0457; B62D 5/0403; B62D 5/0481
USPC ...................................................... 180/444
See application file for complete search history.

(56) References Cited

U.S. PATENT DOCUMENTS

| | | | |
|---|---|---|---|
| 2013/0306396 A1 | 11/2013 | Tojo | |
| 2015/0175192 A1* | 6/2015 | Sin .................. | B62D 5/0484 |
| | | | 318/483 |
| 2017/0341681 A1* | 11/2017 | Shiino ................. | F16H 25/2418 |
| 2018/0194390 A1* | 7/2018 | Goto .................... | B62D 5/0484 |
| 2019/0047611 A1* | 2/2019 | Murakami ........... | H02K 7/1166 |

FOREIGN PATENT DOCUMENTS

| | | |
|---|---|---|
| DE | 102006051799 A1 | 5/2008 |
| DE | 102008041303 A1 | 2/2010 |
| EP | 3144206 A1 | 3/2017 |
| JP | 2013-237401 A | 11/2013 |
| JP | 2017-039459 A | 2/2017 |

OTHER PUBLICATIONS

May 7, 2019 Extended Search Report issued in European Application No. 18210711.0.

* cited by examiner

*Primary Examiner* — Ruth Ilan
*Assistant Examiner* — Hosam Shabara
(74) *Attorney, Agent, or Firm* — Oliff PLC (57) ABSTRACT

A steering system includes a rack shaft, a housing, an electric motor, a control device, and a speed reduction mechanism that applies a moving force in the axial direction to the rack shaft with the speed of rotation of the electric motor reduced. The housing has a rack shaft housing portion and a speed reduction mechanism housing portion. The electric motor has: a motor case fixed to the housing; a plurality of stator cores disposed annularly in the motor case; coil windings wound around the plurality of stator cores; and a rotor. The motor case is formed with a water introduction hole that introduces water that has entered the speed reduction mechanism housing portion into the motor case. The control device has a detector that detects entry of water into the motor case.

8 Claims, 8 Drawing Sheets

STEERING SYSTEM

INCORPORATION BY REFERENCE

The disclosure of Japanese Patent Application No. 2017-235906 filed on Dec. 8, 2017 including the specification, drawings and abstract, is incorporated herein by reference in its entirety.

BACKGROUND OF THE INVENTION

1. Field of the Invention

The present invention relates to a steering system for a vehicle.

2. Description of the Related Art

As described in Japanese Patent Application Publication No. 2013-237401 (JP 2013-237401 A) and Japanese Patent Application Publication No. 2017-39459 (JP 2017-39459 A), for example, a steering system for a vehicle according to the related art includes a steered shaft (rack shaft) that is movable to be advanced and retracted in the axial direction along the vehicle width direction to steer steered wheels, the steered shaft being housed in a housing fixed to the vehicle body. Both end portions of the steered shaft project from the housing, and tie rods are turnably coupled to respective end portions of the steered shaft via ball joints. When the steered shaft is moved in the axial direction, the right and left steered wheels are steered. The steering systems described in JP 2013-237401 A and JP 2017-39459 A include an assist mechanism that applies a moving force in the axial direction to the steered shaft using an electric motor, assisting the driver in performing a steering operation.

Bellows in a bellows shape made of a resin or rubber are disposed between end portions of the housing and the tie rods in order to inhibit entry of foreign matter such as water into the housing. When the bellows are broken because of a collision of a projecting object on the road surface or the like during travel on rough terrain, for example, water may enter the housing through the broken portion. When the water which has entered the housing is frozen, a force against movement of the steered shaft becomes large, and a large force may be required to operate a steering wheel.

Therefore, the steering system described in JP 2013-237401 A is provided with a drain device in which a drain valve made of a resin is disposed inside a drain case that communicates with a housing. In the steering system described in JP 2017-39459 A, meanwhile, an anti-freezing agent is stored in a housing, and mixed with water that has entered the housing to form an aqueous solution to lower the melting point of the water and suppress freezing of the water.

The steering system described in JP 2013-237401 A requires a number of man-hours to manufacture and assemble the drain case and the drain valve, and thus providing the drain device contributes to increasing the manufacturing cost. In the steering system described in JP 2017-39459 A, meanwhile, the effect of the anti-freezing agent may not be fully achieved if much water is accumulated in the housing. In such respects, the steering systems described in JP 2013-237401 A and JP 2017-39459 A still have room for improvement.

SUMMARY OF THE INVENTION

An object of the present invention is to provide a steering system in which an adverse effect of water that has entered a housing can be suppressed while suppressing an increase in the manufacturing cost.

An aspect of the present invention provides a steering system including: a steered shaft that is movable to be advanced and retracted in an axial direction to steer steered wheels of a vehicle; an electric motor that is supplied with a motor current to rotate a motor shaft; a control device that supplies the motor current to control the electric motor; a speed reduction mechanism that rotates a rotary element with a speed of rotation of the motor shaft of the electric motor reduced and that applies a moving force in the axial direction to the steered shaft through rotation of the rotary element; and a housing that has a first housing portion that houses the steered shaft and a second housing portion that houses the speed reduction mechanism, the first housing portion and the second housing portion being formed to communicate with each other such that water that has entered the first housing portion flows into the second housing portion, in which:

the electric motor has a motor case fixed to the housing, a plurality of stator cores disposed annularly in the motor case, windings for a plurality of phases wound around the plurality of stator cores, a rotor provided inward of the plurality of stator cores to rotate together with the motor shaft, and a bearing that supports the motor shaft so that the motor shaft is rotatable with respect to the motor case; the motor case is formed with a water introduction hole that introduces the water which has entered the second housing portion into the motor case; and the control device has a detector that detects entry of the water into the motor case.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described with reference to FIGS. 1 to 6. The embodiments described below are provided as suitable specific examples for carrying out the present invention, and include portions that specifically implement a variety of technical matters that are technically preferable. However, the technical scope of the present invention is not limited to such a specific aspect.

Figure 1:
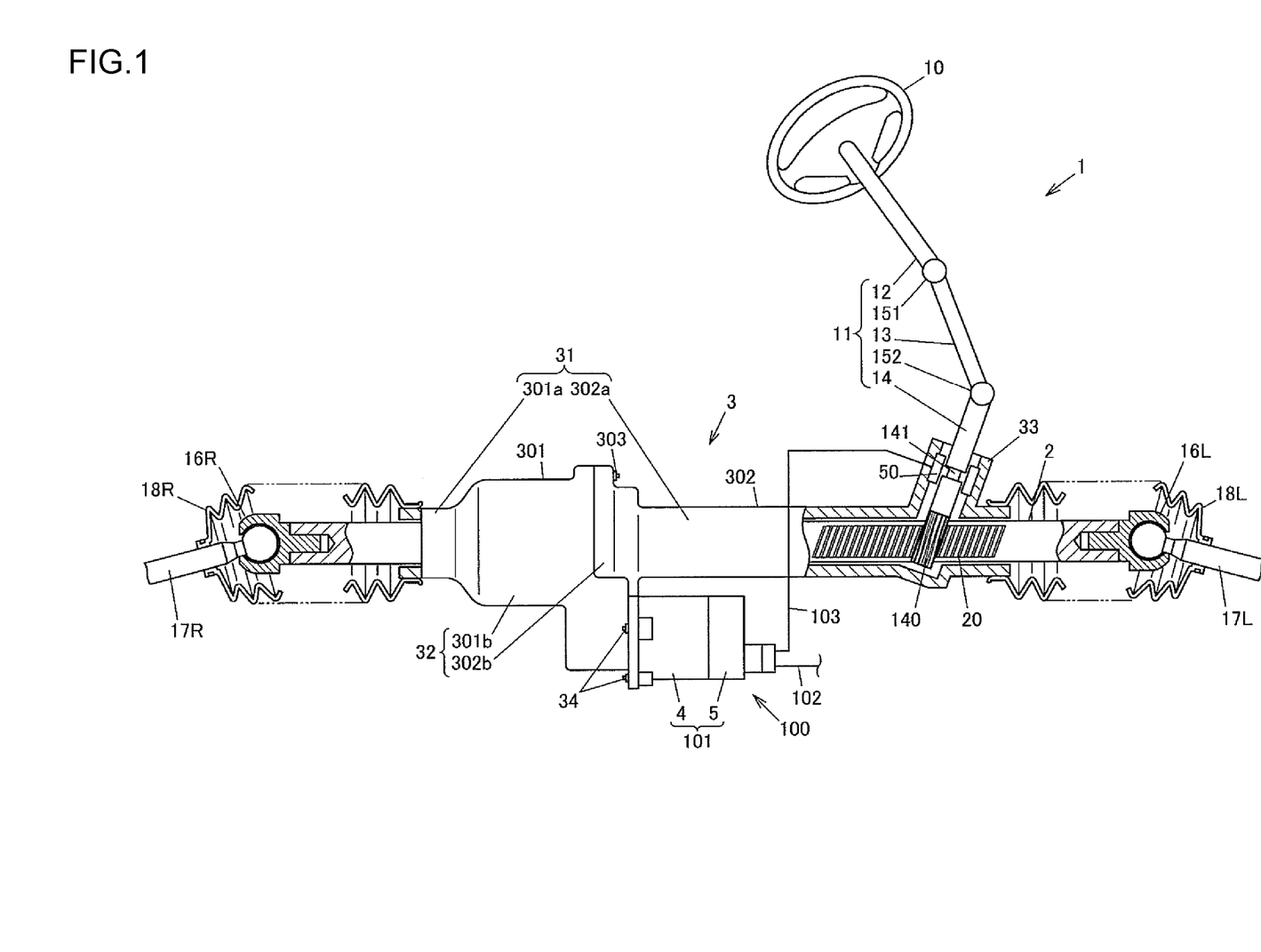
FIG. 1 illustrates the structure of a steering system according to a first embodiment of the present invention.
Figure 2:
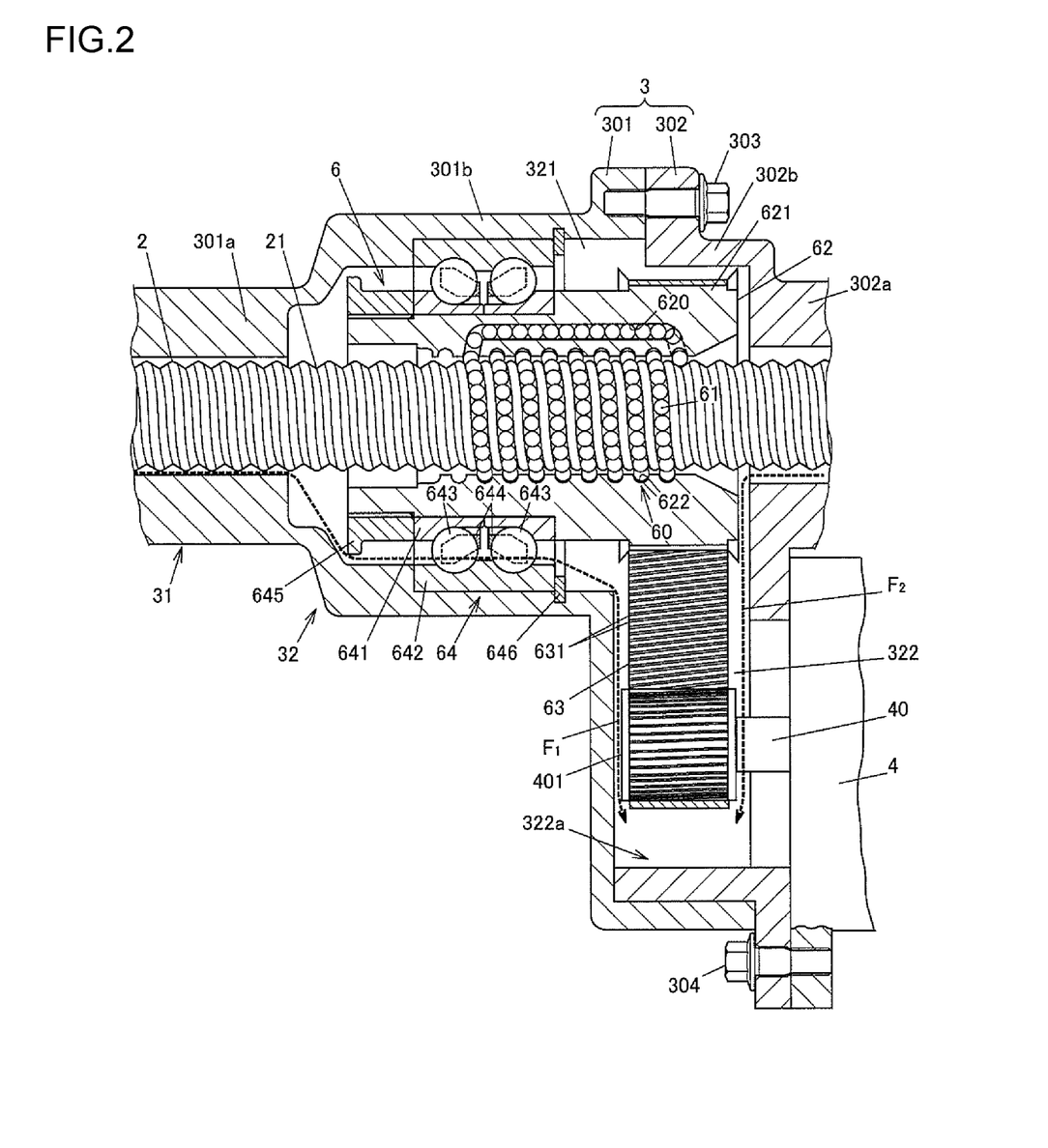
FIG. 2 is a sectional view illustrating the configuration of a part of the steering system.

FIG. 1 illustrates the configuration of the entire steering system according to a first embodiment of the present invention. FIG. 2 is a sectional view illustrating the configuration of a part of the steering system.

A steering system 1 is mounted on a vehicle, and steers right and left front wheels that serve as steered wheels in accordance with a steering operation by a driver. FIG. 1 illustrates a state in which the steering system is seen from the front side of the vehicle, with the left side of the drawing corresponding to the right side of the vehicle and with the right side of the drawing corresponding to the left side of the vehicle. The letter "R" attached to the reference numerals in FIG. 1 indicates the right side of the vehicle, and the letter "L" indicates the left side of the vehicle. In the following description, the terms "right", "left", "upper", and "lower" indicate the "right" and "left" sides in the vehicle width direction and the "upper" and "lower" sides in the vertical direction, respectively. In FIGS. 1 and 2, the lower side of the drawing corresponds to the lower side in the vertical direction with the steering system 1 mounted on the vehicle.

The steering system 1 includes: a steering shaft 11 to which a steering wheel 10 to be subjected to a steering operation by the driver is coupled; a rack shaft 2 that serves as a steered shaft that is movable to be advanced and retracted in the axial direction along the vehicle width direction by the steering operation on the steering wheel 10; a housing 3 that houses the rack shaft 2; an electric motor 4 fixed to the housing 3; a control device 5 that controls the electric motor 4; and a speed reduction mechanism 6 that applies a moving force in the axial direction to the rack shaft 2 with the speed of rotation of a motor shaft 40 of the electric motor 4 reduced.

The housing 3 is fixed to the vehicle body, and houses the speed reduction mechanism 6 and a part of the rack shaft 2. The electric motor 4, the control device 5, and the speed reduction mechanism 6 constitute a steering assist device 100 that assists the driver in performing a steering operation on the steering wheel 10. In the steering system 1, the rack shaft 2 is moved in the axial direction to steer right and left front wheels that serve as the steered wheels.

The steering shaft 11 has: a column shaft 12, one end portion of which is fixed to the steering wheel 10; an intermediate shaft 13 coupled to the column shaft 12 via a universal joint 151; and a pinion shaft 14 coupled to the intermediate shaft 13 via a universal joint 152. The universal joints 151 and 152 are each constituted of a Cardan joint, for example.

Pinion teeth 140 are formed at the distal end portion of the pinion shaft 14. The rack shaft 2 is formed with rack teeth 20 to be meshed with the pinion teeth 140, and a spiral screw groove 21. A part of the pinion shaft 14 is constituted as a flexible torsion bar 141 that is twisted by steering torque applied to the steering wheel 10. The twist angle of the torsion bar 141 is detected by a torque sensor 50. The torque sensor 50 detects the steering torque in accordance with the magnitude of the twist angle of the torsion bar 141.

The rack shaft 2 is coupled to the right and left front wheels via link mechanisms that include right and left tie rods 17R and 17L, respectively, and knuckle arms (not illustrated). Bellows 18R and 18L that each have an expandable bellows structure are provided between respective end portions of the housing 3 and the tie rods 17R and 17L, respectively. The bellows 18R and 18L are made of a resin or rubber, and are in a tubular shape. First end portions of the bellows 18R and 18L are fastened to the outer peripheral surface of the housing 3, and second end portions of the bellows 18R and 18L are fastened to the outer peripheral surface of the tie rods 17R and 17L, inhibiting entry of foreign matter such as water into the housing 3.

As illustrated in FIG. 1, first end portions of the right and left tie rods 17R and 17L are coupled to respective end portions of the rack shaft 2 via ball joints 16R and 16L, respectively. When the rack shaft 2 is moved to be advanced and retracted in the vehicle width direction (right-left direction), the right and left front wheels are steered by the right and left tie rods 17R and 17L, respectively.

As illustrated in FIG. 2, the speed reduction mechanism 6 has: a cylindrical nut member 62 threadedly engaged with the screw groove 21 which is formed in the outer peripheral surface of the rack shaft 2 via a plurality of balls 61; a belt 63 made of synthetic rubber and wound around the nut member 62; and a bearing 64 that supports the nut member 62 so as to be rotatable with respect to the housing 3.

The electric motor 4 is supplied with a motor current from the control device 5 to rotate the motor shaft 40. The control device 5 supplies the motor current to the electric motor 4 to control the electric motor 4. In addition, the control device 5 is attached to and integrated with the electric motor 4. The electric motor 4 and the control device 5 constitute a motor control unit (MCU) 101.

A drive pulley 401 is attached to the distal end portion of the motor shaft 40 so as to be rotatable together therewith. The electric motor 4 rotates the nut member 62 via the belt 63 through rotation of the motor shaft 40. The belt 63 is an endless toothed belt, on the inner peripheral surface of which a plurality of belt teeth 631 are provided. A plurality of meshing teeth 621 to be meshed with the plurality of belt teeth 631 are formed on the outer peripheral surface of the nut member 62. The outside diameter of the nut member 62 is larger than the outside diameter of the drive pulley 401. Output torque of the electric motor 4 is transferred to the nut member 62 by the belt 63 with the speed of the output reduced.

In addition, a spiral screw groove 622 in which the plurality of balls 61 roll is formed in the inner peripheral surface of the nut member 62. The plurality of balls 61 roll in a rolling passage 60 formed from the screw groove 21 of the rack shaft 2 and the screw groove 622 of the nut member 62. In addition, the nut member 62 is formed with a circulation passage 620 that opens at two locations of the rolling passage 60 and that circulates the plurality of balls 61 through the rolling passage 60. The plurality of balls 61 are circulated through the rolling passage 60 via the circulation passage 620 through rotation of the nut member 62.

In this manner, the speed reduction mechanism 6 rotates the nut member 62 which serves as a rotary element with the speed of rotation of the motor shaft 40 of the electric motor 4 reduced, and applies a moving force in the axial direction to the rack shaft 2 through rotation of the nut member 62.

The bearing 64 is a rolling bearing that has: an inner ring 641 fixed to the nut member 62; an outer ring 642 fixed to the housing 3; a plurality of rolling elements 643 disposed between the inner ring 641 and the outer ring 642; and annular cages 644 that hold the plurality of rolling elements 643. In the present embodiment, the rolling elements 643 are spherical, and are held by the cages 644 which are each in a crown shape. In the present embodiment, in addition, the plurality of rolling elements 643 are disposed in a plurality of rows, and the plurality of rolling elements 643 in a first row and a second row are held by a pair of cages 644. The inner ring 641 is fixed to the nut member 62 by a ring nut 645. Axial movement of the outer ring 642 in the housing 3 is restricted by a retention ring 646.

The housing 3 has: a cylindrical rack shaft housing portion 31 that houses the rack shaft 2; a speed reduction mechanism housing portion 32 that houses the speed reduction mechanism 6; and a pinion shaft housing portion 33 that houses the pinion shaft 14. In addition, the housing 3 is constituted by coupling a first housing member 301 and a second housing member 302 to each other using a plurality of bolts 303. The rack shaft housing portion 31 is formed from a cylindrical portion 301a of the first housing member 301 and a cylindrical portion 302a of the second housing member 302. The speed reduction mechanism housing portion 32 is formed from a tubular portion 301b of the first housing member 301 and a tubular portion 302b of the second housing member 302. The rack shaft housing portion 31 corresponding to the first housing portion according to the present invention. The speed reduction mechanism housing portion 32 corresponds to the second housing portion according to the present invention.

The speed reduction mechanism housing portion 32 is formed with: an upper housing chamber 321 that houses the nut member 62; and a lower housing chamber 322 that is provided below the upper housing chamber 321 in the vertical direction and that houses the drive pulley 401. The central axis of the motor shaft 40 is disposed below the central axis of the rack shaft 2. The lower housing chamber 322 is formed so as to bulge downward from the upper housing chamber 321.

In the steering system 1 configured as described above, when the bellows 18R or the bellows 18L are broken, water may enter the rack shaft housing portion 31 of the housing 3 through the broken portion. As illustrated in FIG. 2, the rack shaft housing portion 31 and the speed reduction mechanism housing portion 32 communicate with each other such that water that has entered the rack shaft housing portion 31 flows into the speed reduction mechanism housing portion 32. The water first flows from the rack shaft housing portion 31 into the upper housing chamber 321 of the speed reduction mechanism housing portion 32, and flows from the upper housing chamber 321 into the lower housing chamber 322 because of the gravitational force.

Figure 3:
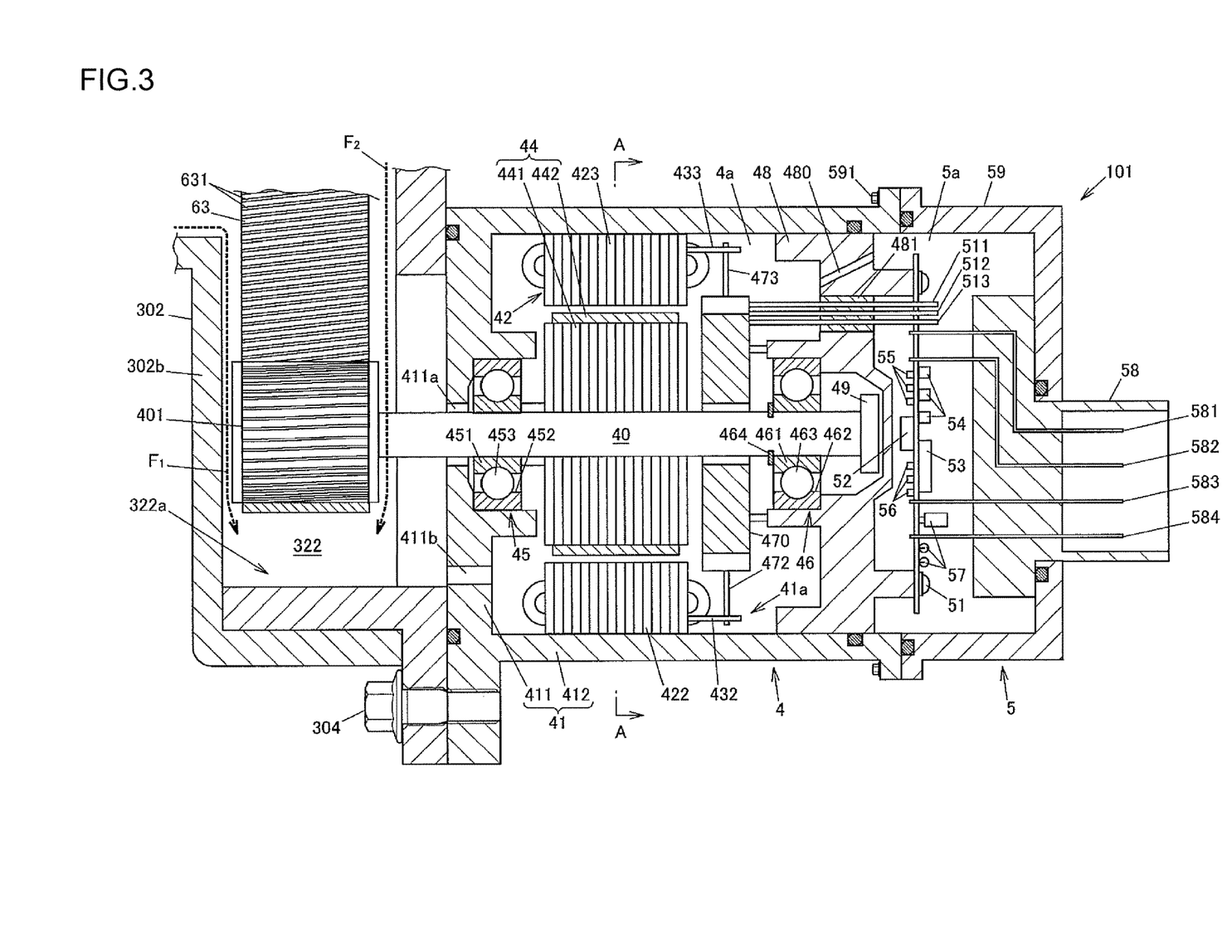
FIG. 3 is a sectional view illustrating the structure of a motor control unit (MCU)

In FIG. 2 and FIG. 3 to be discussed later, the flow path for water that has entered the rack shaft housing portion 31 (the cylindrical portion 301a of the first housing member 301) through the broken portion of the bellows 18R on the right side of the vehicle to reach the lower housing chamber 322 by way of the upper housing chamber 321 is indicated by the arrow $F_1$, and the flow path for water that has entered the rack shaft housing portion 31 (the cylindrical portion 302a of the second housing member 302) through the broken portion of the bellows 18L on the left side of the vehicle to reach the lower housing chamber 322 by way of the upper housing chamber 321 is indicated by the arrow $F_2$. Water that has entered through the broken portion of the bellows 18R on the right side of the vehicle reaches the lower housing chamber 322 by way of a clearance between the outer ring 642 and the cages 644 in the bearing 64.

When water that has flowed into the lower housing chamber 322 is accumulated at a lower end portion 322a of the lower housing chamber 322 to such an amount that the belt 63 is soaked in the water and frozen because of a low temperature, the resistance against rotation of the belt 63 is increased, a sufficient steering assist force may not be achieved, and the driver may feel a steering operation on the steering wheel 10 as being heavy. Thus, in the present embodiment, water that has flowed into the lower housing chamber 322 is caused to flow into the electric motor 4, and the control device 5 detects that the water has flowed into the electric motor 4. A specific configuration of the MCU 101 therefor will be described in detail below.

Figure 4:
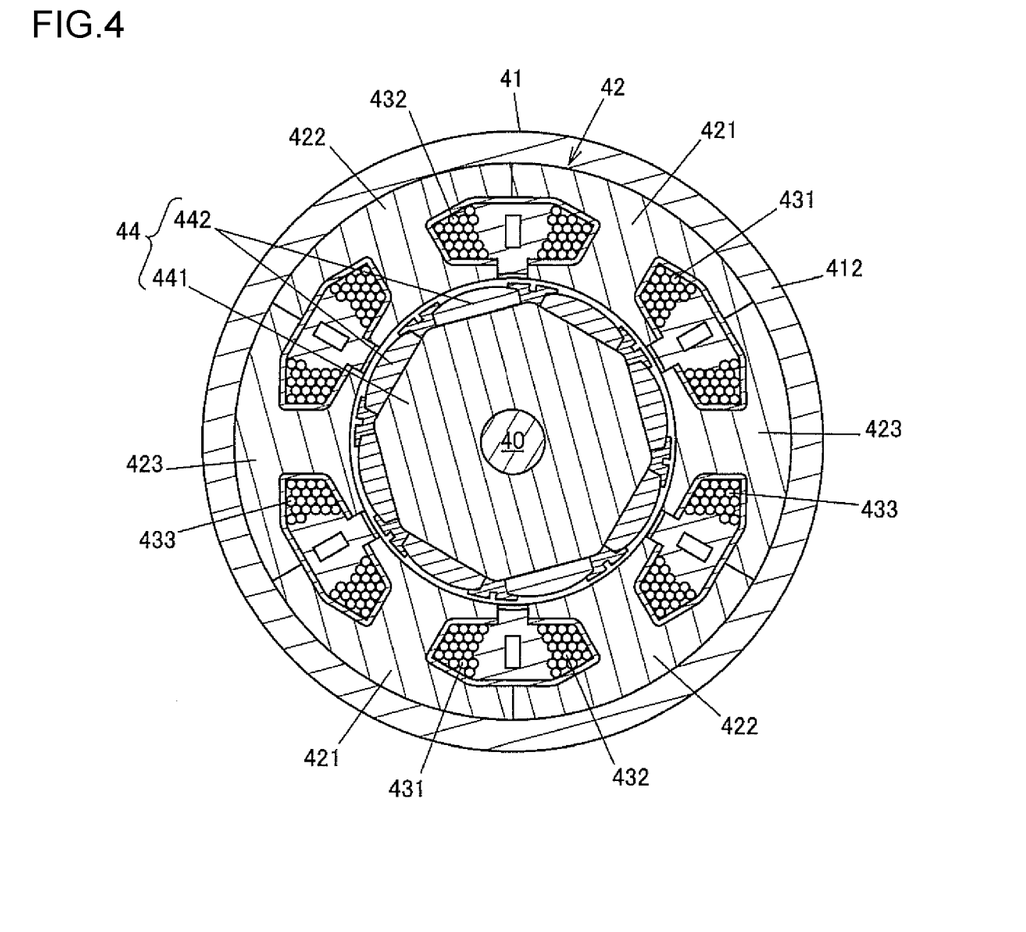
FIG. 4 is a cross-sectional view taken along the line A-A in FIG. 3.
Figure 5:
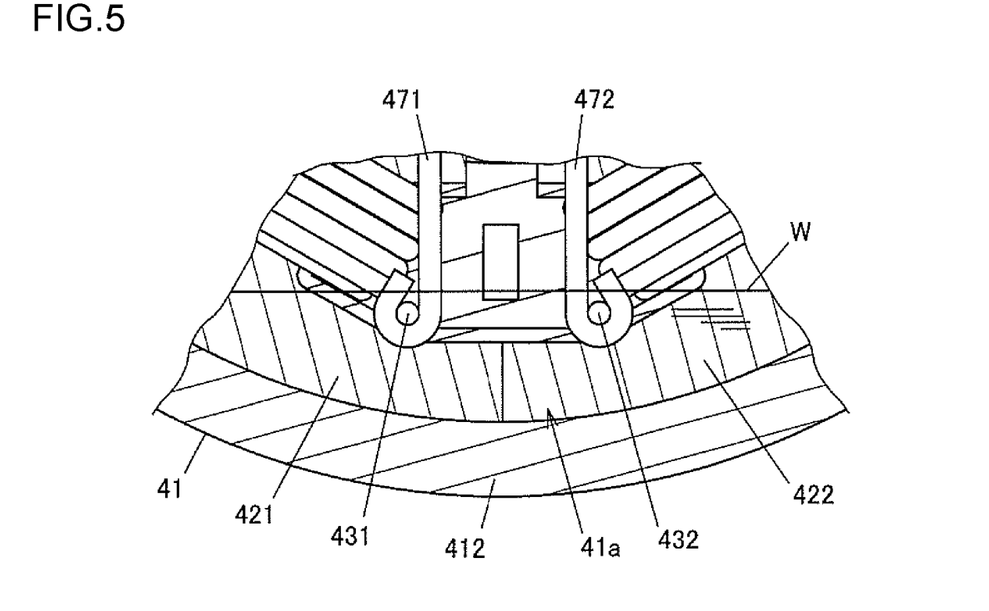
FIG. 5 illustrates a connection portion between bus bars and coil windings.
Figure 6:
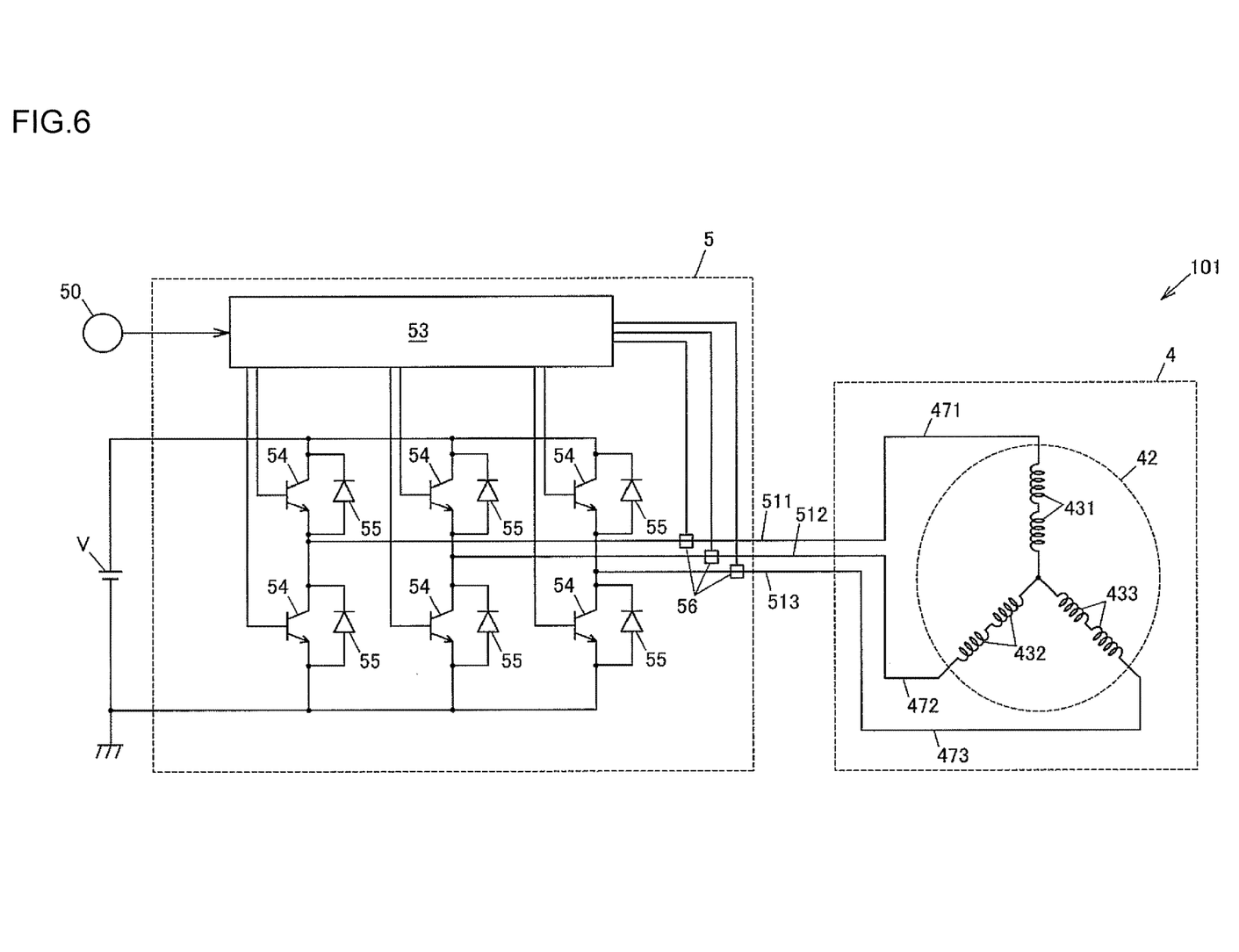
FIG. 6 is a schematic diagram illustrating the circuit configuration of the MCU.

FIG. 3 is a sectional view illustrating the structure of the MCU 101. FIG. 4 is a cross-sectional view taken along the line A-A in FIG. 3. FIG. 5 illustrates a connection portion between bus bars 471 and 472 and coil windings 431 and 432 to be discussed later. FIG. 6 is a schematic diagram illustrating an example of the circuit configuration of the MCU 101. In the present embodiment, the electric motor 4 is constituted as a three-phase brushless motor.

In addition to the motor shaft 40, the electric motor 4 has: a motor case 41 fixed to the housing 3; stators 42 disposed in the motor case 41; a rotor 44 that is provided inward of the plurality of stators 42 and that rotates together with the motor shaft 40; first and second bearings 45 and 46 that support the motor shaft 40 so that the motor shaft 40 is rotatable with respect to the motor case 41; bus bars 471 to 473; and a partition wall 48.

The motor case 41 is made of an aluminum alloy, for example, and formed in a bottomed cylindrical shape in which a bottom portion 411 and a cylindrical portion 412 are integral with each other. The bottom portion 411 is formed with an insertion hole 411a for insertion of the motor shaft 40. In addition, the motor case 41 is fixed to the tubular portion 302b of the second housing member 302 by a plurality of bolts 304, and electrically grounded. In FIGS. 2 and 3, one of such bolts 304 is illustrated. An opening of the motor case 41 on the opposite side from the bottom portion 411 is closed by the partition wall 48 which is made of an aluminum alloy, for example.

The partition wall 48 separates an internal space 4a of the motor case 41 and an internal space 5a of the control device 5 from each other. In addition, the partition wall 48 is formed with an air hole 480. The air hole 480 secures ventilation between the internal space 4a of the motor case 41 and the internal space 5a of the control device 5. For example, when the temperature in the control device 5 is raised, air in the control device 5 flows toward the motor case 41 by way of the air hole 480. Consequently, the internal pressure of the control device 5 is inhibited from becoming excessive because of thermal expansion of air. When the temperature in the motor case 41 is raised, air is discharged to the housing 3 through a clearance between the motor shaft 40 and the inner surface of the insertion hole 411a.

The stator 42 includes a stator core 421 for U-phase, a stator core 422 for V-phase, and a stator core 423 for W-phase disposed annularly. In the present embodiment, the stator 42 has two stator cores 421, two stator cores 422, and two stator cores 423 for the respective phases. U-phase coil windings 431 are wound around the stator cores 421 for U-phase. V-phase coil windings 432 are wound around the stator cores 422 for V-phase. W-phase coil windings 433 are wound around the stator cores 423 for W-phase.

The control device 5 outputs a three-phase AC current as the motor current from first to third output terminals 511 to 513. The U-phase coil windings 431 are electrically connected to the first output terminal 511 by the first bus bar 471. The V-phase coil windings 432 are electrically connected to the second output terminal 512 by the second bus bar 472. The W-phase coil windings 433 are electrically connected to the third output terminal 513 by the third bus bar 473. In FIG. 3, the second and third bus bars 472 and 473 are illustrated. In FIG. 5, the first and second bus bars 471 and 472 are illustrated.

The first to third bus bars 471 to 473 are held by a retainer 470 made of a resin. The first and second bus bars 471 and 472 extend downward from the retainer 470. The respective distal end portions of the first and second bus bars 471 and 472 are connected to the U-phase and V-phase coil windings 431 and 432 by fusing (thermal caulking), for example. The third bus bar 473 extends upward from the retainer 470. The distal end portion of the third bus bar 473 is connected to the W-phase coil winding 433 also by fusing. The coil windings 431, 432, and 433 are formed from an enameled wire formed by enameling a metal conductor wire. The enamel coating has been removed at connection portions of the coil windings 431, 432, and 433 with the first to third bus bars 471 to 473, respectively.

The rotor 44 includes a rotor core 441 and a plurality of permanent magnets 442 fixed to the outer peripheral surface of the rotor core 441. In the present embodiment, the rotor 44 has eight permanent magnets 442. The plurality of permanent magnets 442 include those with N pole on the rotor core 441 side and with S pole on the stator 42 side and those with S pole on the rotor core 441 side and with N pole on the stator 42 side, which are disposed alternately.

The first bearing 45 has: an inner ring 451 externally fitted with the motor shaft 40 between the rotor 44 and the bottom portion 411 of the motor case 41; an outer ring 452 supported by the bottom portion 411 of the motor case 41; and a plurality of spherical rolling elements 453 disposed between the inner ring 451 and the outer ring 452. The second bearing 46 has: an inner ring 461 externally fitted with the motor shaft 40 between the rotor 44 and the partition wall 48; an outer ring 462 supported by the partition wall 48; and a plurality of spherical rolling elements 463 disposed between the inner ring 461 and the outer ring 462.

The partition wall 48 is formed with the air hole 480 above the second bearing 46. In the present embodiment, one air hole 480 is formed in the partition wall 48. However, a plurality of air holes 480 may be formed in the partition wall 48, and a filter that prevents entry of foreign matter to the control device 5 side may be disposed in the air hole 480. In addition, a grommet 481 is mounted to the partition wall 48, and the first to third output terminals 511 to 513 are inserted through the grommet 481.

A permanent magnet 49 that has a plurality of magnetic poles in the circumferential direction is fixed to an end portion of the motor shaft 40 on the partition wall 48 side. The partition wall 48 has been thinned at a portion that faces the permanent magnet 49 in the axial direction. The magnetic field of the permanent magnet 49 is detected by a magnetic sensor 52 mounted on a substrate 51 to be discussed later via the partition wall 48. A detection signal from the magnetic sensor 52 indicates the rotational phase of the motor shaft 40.

The control device 5 includes: the substrate 51 which is fixed to the partition wall 48; a variety of electronic components mounted on the substrate 51; and a cover 59 fixed to the motor case 41 by bolts 591. In addition to the magnetic sensor 52, a microcomputer 53, a plurality of switching elements 54 and diodes 55, a plurality of current sensors 56, and passive elements 57 such as resistors and capacitors are mounted on the substrate 51. The control device 5 is supplied with power from a DC power source such as a battery, for example, via a power source line 102 (see FIG. 1) and power source terminals 581 and 582 of a connector 58. In addition, the microcomputer 53 can receive a signal detected by the torque sensor 50 from the torque sensor 50 via a signal line 103 (see FIG. 1) and signal terminals 583 and 584 of the connector 58.

The plurality of switching elements 54 are each constituted of a transistor, for example, and are connected to each other through three-phase bridge connection as illustrated in FIG. 6. The diode 55 is connected in parallel with each switching element 54. The control device 5 switches a DC voltage V by turning on and off the switching elements 54, and outputs a three-phase AC current to the electric motor 4.

Currents for U-phase, V-phase, and W-phase are detected by the current sensors 56 such as Hall ICs, and detection signals from the current sensors 56 are output to the microcomputer 53. The microcomputer 53 computes currents for the respective phases to be supplied to the coil windings 431, 432, and 433 of the electric motor 4 on the basis of the steering torque which is detected by the torque sensor 50 and the rotational phase of the motor shaft 40 which is detected by the magnetic sensor 52, and outputs a PWM signal for turning on and off the plurality of switching elements 54. In addition, the microcomputer 53 performs feedback control on the currents for the respective phases on the basis of the detection signals from the current sensors 56.

The bottom portion 411 of the motor case 41 is formed with a water introduction hole 411*b* that introduces water that has entered the lower housing chamber 322 of the housing 3 into the motor case 41. The water introduction hole 411*b* opens in the lower end portion 322*a* of the lower housing chamber 322, and penetrates the bottom portion 411 of the motor case 41. At least a lower end portion 41*a* of the internal space 4*a* of the motor case 41 is formed below the lower end portion 322*a* of the lower housing chamber 322. Water flows from the lower housing chamber 322 into the lower end portion 41*a* of the motor case 41 via the water introduction hole 411*b*.

The water introduction hole 411*b* is provided below the axis of the rack shaft 2, and provided below the first bearing 45 which is supported by the bottom portion 411 of the motor case 41, with the steering system 1 mounted on the vehicle and with the housing 3 fixed to the vehicle body. Thus, water in the housing 3 can be efficiently introduced into the motor case 41. Then, water flows from the lower housing chamber 322 into the lower end portion 41*a* of the motor case 41, suppressing accumulation of such an amount of water that affects the steering feel in the lower housing chamber 322.

When water is accumulated in the lower end portion 41*a* of the motor case 41 and the water level becomes higher than the connection portion between the U-phase coil windings 431 and the first bus bar 471 and the connection portion between the V-phase coil windings 432 and the second bus bar 472 as illustrated in FIG. 5, the inter-phase impedance between U-phase and V-phase as seen from the control device 5 is varied. That is, the U-phase coil windings 431 and the V-phase coil windings 432 are connected to each other by a virtual resistor. In FIG. 5, a water surface W of water accumulated in the lower end portion 41*a* is indicated.

Such variations in the inter-phase impedance are manifested as variations in current values detected by the current sensors 56, and thus can be detected by the microcomputer 53. That is, in the case where the inter-phase impedance is varied, there occurs a difference between the current values which are calculated in accordance with the duty of the PWM signal or the rotational speed of the motor shaft 40 and the actual current values which are detected by the current sensors 56. Thus, the microcomputer 53 can detect variations in the inter-phase impedance on the basis of the difference, and hence can detect entry of water into the motor case 41.

That is, the control device 5 has a detector that detects entry of water into the motor case 41. In the present embodiment, the detector is implemented by the microcomputer 53 and the plurality of current sensors 56. However, the present invention is not limited thereto, and entry of water into the motor case 41 may be detected in accordance with variations in the impedance due to variations in the electrical resistance (insulation resistance) between any of the first to third bus bars 471 to 473 and the motor case 41, for example.

Furthermore, a water detection sensor that detects entry of water in accordance with variations in the electrical resistance or the capacitance between a pair of electrodes may be used as the detector. However, configuring the detector as in the present embodiment makes it possible to detect entry of water without using a component such as a water detection sensor, and thus contributes to a cost reduction.

When entry of water into the motor case 41 is detected, the microcomputer 53 outputs an alarm signal to give an alarm to the driver, prompting the driver to have the steering system repaired. This alarm is issued by turning on a warning lamp on an instrument panel on the front surface of the driver's seat, for example. In addition, the microcomputer 53 continues controlling the electric motor 4 even after an alarm signal is output.

According to the first embodiment of the present invention described above, it is possible to suppress an adverse effect of water that has entered the housing 3 while suppressing an increase in the manufacturing cost. More specifically, it is possible to suppress variations in the steering feel due to water having entered the housing 3 being frozen.

Next, a second embodiment of the present invention will be described with reference to FIGS. 7 and 8.

Figure 7:
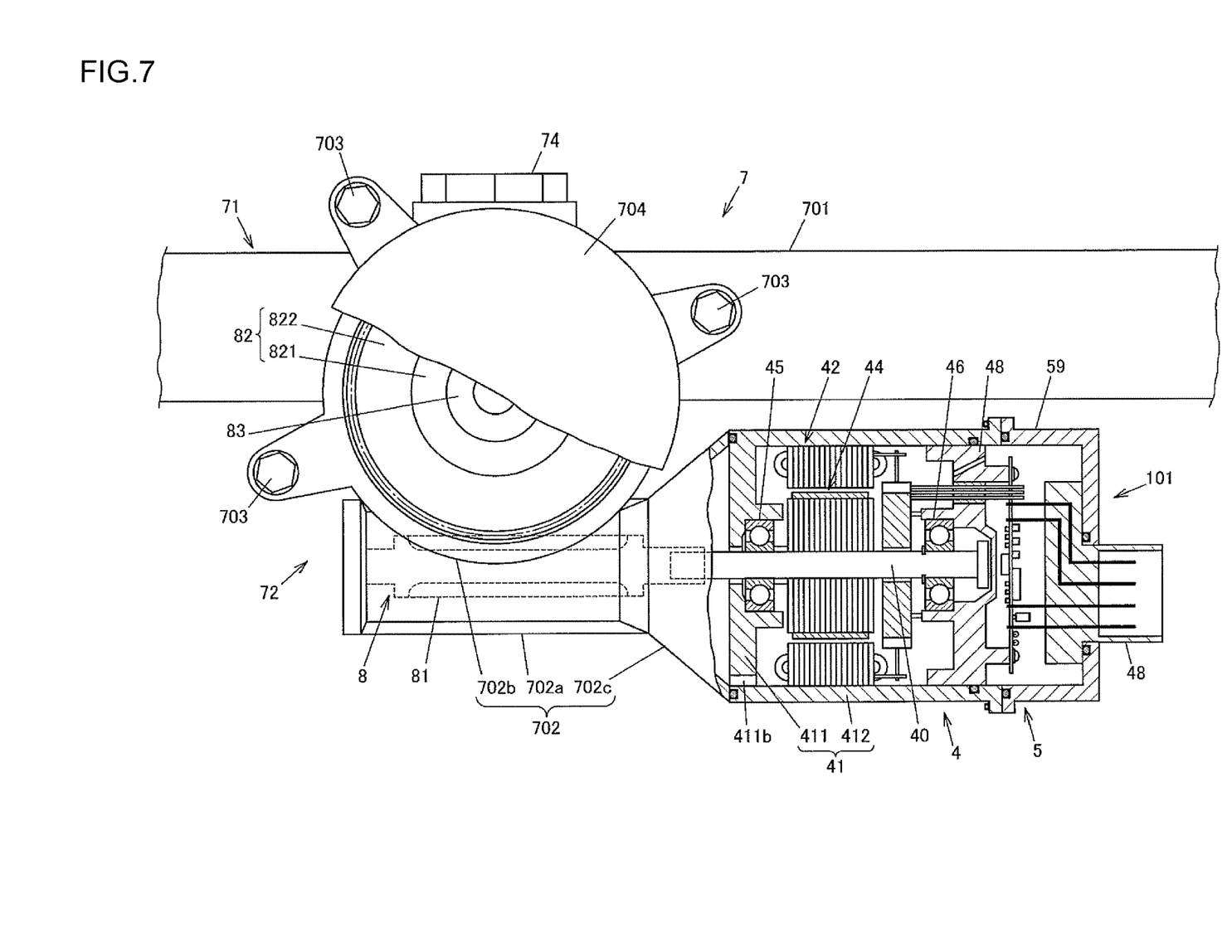
FIG. 7 illustrates the structure of a steering system according to a second embodiment of the present invention.
Figure 8:
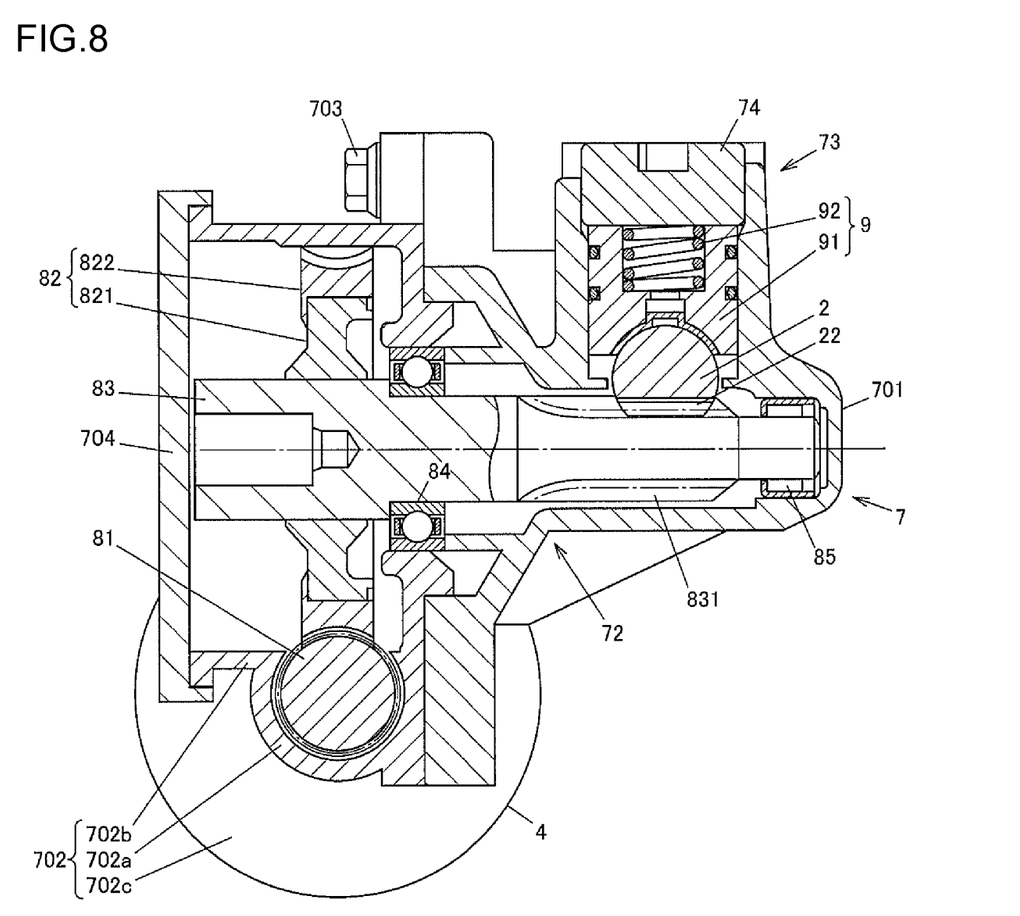
FIG. 8 is a sectional view taken along the line B-B in FIG. 7.

FIG. 7 illustrates the structure of a steering system according to a second embodiment of the present invention. FIG. 8 is a sectional view taken along the line B-B in FIG. 7. In FIGS. 7 and 8, the lower side of the drawing corresponds to the lower side in the vertical direction with the steering system mounted on the vehicle.

In the present embodiment, the configuration of a housing 7 and a speed reduction mechanism 8 is different from that of the housing 3 and the speed reduction mechanism 6 according to the first embodiment. In addition, the rack shaft 2 which is housed in the housing 7 is formed with rack teeth 22 in place of the screw groove 21. The configuration of the MCU 101 is the same as that according to the first embodiment. The configuration of the housing 7 and the speed reduction mechanism 8 will be mainly described below.

The housing 7 has a rack shaft housing portion 71 that houses the rack shaft 2 and a speed reduction mechanism housing portion 72 that houses the speed reduction mechanism 8. The rack shaft housing portion 71 and the speed reduction mechanism housing portion 72 communicate with each other such that water that has entered the rack shaft housing portion 71 flows into the speed reduction mechanism housing portion 72. In addition, the housing 7 is constituted by coupling a first housing member 701 and a second housing member 702 to each other using a plurality of bolts 703. The rack shaft housing portion 71 is formed by the first housing member 701. The speed reduction mechanism housing portion 72 is formed by the first housing member 701 and the second housing member 702 which are coupled to each other.

In addition, the first housing member 701 is formed with a cylindrical rack guide housing portion 73. The rack guide housing portion 73 houses a rack guide mechanism 9 that has a support yoke 91 and a coil spring 92. The rack guide housing portion 73 is closed by a cap 74. The support yoke 91 presses the rack shaft 2 against a pinion gear 83 to be discussed later using the elastic force of the coil spring 92, one end portion of which abuts against the cap 74.

The speed reduction mechanism 8 has: a worm 81 attached to the motor shaft 40 of the electric motor 4 so as to rotate together therewith; a worm wheel 82 meshed with the worm 81; and the pinion gear 83 which is rotatable together with the worm wheel 82. In the worm wheel 82, an annular tooth portion 822 made of a resin is fixed to the outer periphery of a disk portion 821 made of metal and externally fitted with the pinion gear 83. The pinion gear 83 is supported by bearings 84 and 85, and has pinion teeth 831 meshed with the rack teeth 22 of the rack shaft 2. The pinion gear 83 applies a moving force in the axial direction to the rack shaft 2 by rotating together with the worm wheel 82. The worm wheel 82 corresponds to the rotary element according to the present invention. The central axis of the motor shaft 40 is disposed below the central axis of the rack shaft 2.

The worm 81 and the worm wheel 82 are housed in the second housing member 702. The second housing member 702 has: a small diameter cylindrical portion 702a that houses the worm 81; a large diameter cylindrical portion 702b that houses the worm wheel 82; and a coupling portion 702c that extends from one end portion of the small diameter cylindrical portion 702a. The small diameter cylindrical portion 702a is provided below the large diameter cylindrical portion 702b. The coupling portion 702c has a partial conical shape that projects from one end portion of the small diameter cylindrical portion 702a while increasing in diameter along the axial direction. The motor case 41 is fixed to an end portion of the coupling portion 702c on the large diameter side by bolts (not illustrated). The large diameter cylindrical portion 702b opens at an end portion on the opposite side from the rack shaft 2. The opening is closed by a cover 704. In FIG. 7, the cover 704 is illustrated as being cut away to illustrate the inside of the large diameter cylindrical portion 702b.

The water introduction hole 411b of the motor case 41 opens at the lower end portion inside the coupling portion 702c of the second housing member 702 to introduce water that has flowed from the rack shaft housing portion 71 into the speed reduction mechanism housing portion 72 into the motor case 41. As in the first embodiment, the water introduction hole 411b is provided below the axis of the rack shaft 2, and also provided below the first bearing 45.

Also according to the second embodiment of the present invention described above, as with the first embodiment, it is possible to suppress an adverse effect of water that has entered the housing 7 while suppressing an increase in the manufacturing cost.

While the present invention has been described above on the basis of the embodiments, all combinations of the characteristics described in relation to the embodiments are not necessarily essential to address the issue of the invention. In addition, the present invention can be modified, as appropriate, without departing from the scope and spirit of the present invention. For example, the present invention is also applicable to a steer-by-wire steering system in which a steered shaft that steers steered wheels and a steering wheel are not mechanically connected to each other.

What is claimed is:

1. A steering system comprising:
a steered shaft that is movable to be advanced and retracted in an axial direction to steer steered wheels of a vehicle;
an electric motor that is supplied with a motor current to rotate a motor shaft;
a control device that supplies the motor current to control the electric motor;
a speed reduction mechanism that rotates a rotary element with a speed of rotation of the motor shaft of the electric motor reduced and that applies a moving force in the axial direction to the steered shaft through rotation of the rotary element; and
a housing that has a first housing portion that houses the steered shaft and a second housing portion that houses the speed reduction mechanism, the first housing portion and the second housing portion being formed to communicate with each other such that water that has entered the first housing portion flows into the second housing portion, wherein:
the electric motor has a motor case fixed to the housing, a plurality of stator cores disposed annularly in the motor case, windings for a plurality of phases wound around the plurality of stator cores, a rotor provided inward of the plurality of stator cores to rotate together with the motor shaft, and a bearing that supports the motor shaft so that the motor shaft is rotatable with respect to the motor case;
the motor case is formed with a water introduction hole that introduces the water which has entered the second housing portion into the motor case; and
the control device has a detector that detects entry of the water into the motor case, wherein
the detector detects entry of the water into the motor case on the basis of variations in a detection value of the motor current which is supplied to the windings for the plurality of phases.

2. The steering system according to claim 1, wherein the water introduction hole is provided below an axis of the steered shaft with the housing fixed to a vehicle body.

3. The steering system according to claim 1, wherein the water introduction hole is provided below the bearing with the housing fixed to a vehicle body.

4. The steering system according to claim 1, wherein:
the speed reduction mechanism has a nut member that serves as the rotary element and that is threadedly engaged with a screw groove formed on an outer peripheral surface of the steered shaft via a plurality of balls, and a belt wound around the nut member;
a drive pulley that rotates the belt is attached to the motor shaft;
the second housing portion is formed with an upper housing chamber that houses the nut member and a lower housing chamber that houses the drive pulley; and
the motor case is fixed to the second housing portion, and the water introduction hole opens in the lower housing chamber.

5. The steering system according to claim 1, wherein:
the speed reduction mechanism has a worm attached to the motor shaft, and a worm wheel that serves as the rotary element and that is meshed with the worm;
the second housing portion has a small diameter cylindrical portion that houses the worm, a large diameter cylindrical portion that houses the worm wheel, and a coupling portion that extends in the axial direction from the small diameter cylindrical portion;
the small diameter cylindrical portion is provided below the large diameter cylindrical portion; and
the motor case is fixed to the coupling portion, and the water introduction hole opens into the coupling portion.

6. A steering system comprising:
a steered shaft that is movable to be advanced and retracted in an axial direction to steer steered wheels of a vehicle;
an electric motor that is supplied with a motor current to rotate a motor shaft;
a control device that supplies the motor current to control the electric motor;
a speed reduction mechanism that rotates a rotary element with a speed of rotation of the motor shaft of the electric motor reduced and that applies a moving force in the axial direction to the steered shaft through rotation of the rotary element; and
a housing that has a first housing portion that houses the steered shaft and a second housing portion that houses the speed reduction mechanism, the first housing portion and the second housing portion being formed to communicate with each other such that water that has entered the first housing portion flows into the second housing portion, wherein:
the electric motor has a motor case fixed to the housing, a plurality of stator cores disposed annularly in the motor case, windings for a plurality of phases wound around the plurality of stator cores, a rotor provided inward of the plurality of stator cores to rotate together with the motor shaft, and a bearing that supports the motor shaft so that the motor shaft is rotatable with respect to the motor case;
the motor case is formed with a water introduction hole that introduces the water which has entered the second housing portion into the motor case; and
the control device has a detector that detects entry of the water into the motor case, wherein
the speed reduction mechanism has a nut member that serves as the rotary element and that is threadedly engaged with a screw groove formed on an outer peripheral surface of the steered shaft via a plurality of balls, and a belt wound around the nut member;
a drive pulley that rotates the belt is attached to the motor shaft;
the second housing portion is formed with an upper housing chamber that houses the nut member and a lower housing chamber that houses the drive pulley; and
the motor case is fixed to the second housing portion, and the water introduction hole opens in the lower housing chamber.

7. The steering system according to claim 6, wherein the water introduction hole is provided below an axis of the steered shaft with the housing fixed to a vehicle body.

8. The steering system according to claim 6, wherein the water introduction hole is provided below the bearing with the housing fixed to a vehicle body.

* * * * *